3,475,188
REFRACTORY COMPOSITIONS
Dennis Woodhouse, Worksop, and Arthur John Harbach, Whitwell, England, assignors to The Steetley Refractory Brick Company Limited, Oughtibridge, near Sheffield, Yorkshire, England, a British company
No Drawing. Filed Sept. 27, 1966, Ser. No. 582,228
Claims priority, application Great Britain, Sept. 29, 1965, 41,393/65; Mar. 16, 1966, 11,556/66
Int. Cl. C04b 35/68, 7/00
U.S. Cl. 106—58                    6 Claims

ABSTRACT OF THE DISCLOSURE

A composition suitable for making refractory furnace linings consisting of a particulate refractory substance and an absorbent. A liquid bonding agent is absorbed onto the absorbent to produce a dry material. When water is added to a mixture of the two dry components, the bonding agent is flushed from the absorbent and reacts with the refractory material to form a bonded refractory mass.

---

This invention relates to refractory compositions for use, for example, in lining steel furnaces.

According to the present invention there is provided a refractory composition comprising a fine fraction, and optionally also a coarse fraction of a basic, neutral or acidic refractory material, the composition further comprising a dry chemically inert absorbent material having absorbed therein a liquid chemical bonding agent in amount sufficient to react with at least a proportion of the fine fraction of refractory material and bond the refractory composition together on the addition of water.

The term "chemically inert" is used in connection with the absorbent material to indicate that the said material does not react chemically with the refractory material in the conditions under which the composition is formulated.

The term "fine fraction" in accordance with this invention is defined as a material substantially all of which passes a 25 B.S. mesh sieve.

The present invention further provides a chemically bonded refractory material whenever made from the composition described above, and also fired refractory structures whenever made from such chemically bonded materials.

The refractory material may be for example alumina, dead-burned magnesite or chrome ore.

The fine fraction of refractory material preferably passes a 72 B.S. mesh sieve and usually constitutes from 10% to 100% of the refractory material, the coarser material constituting from 90% to 0% of the refractory material.

A preferred form of the invention is one in which the refractory material contains a proportion of finely divided dead-burnt magnesite, preferably at least 25% by weight, which, on the addition of water, reacts with the liquid chemical bonding agent absorbed in the dry inert absorbent material. The finely divided dead-burned magnesite preferably passes a 72 mesh B.S. sieve.

The inert absorbent material used for the liquid chemical bonding agent is preferably in the form of a finely divided powder, for example of kieselguhr, bentonite, fuller's earth, chrome ore, or quartzite, or in the form of a mixture of such materials. The inert absorbent material may constitute for example up to 50% by weight, or more, of the composition. However the optimum amount in any particular case will depend on such factors as the liquid bonding agent used and the refractory material to be bonded. The optimum amount may readily be determined by routine experiment. The examples herein show satisfactory results with up to about 5% by weight of inert material additionally containing liquid bonding agent. The combination of such a powder with the absorbed liquid chemical bonding agent is hereafter referred to as a bonding powder.

The liquid chemical bonding agent is preferably an acid such as sulphuric acid, hydrochloric acid, chromic acid or phosphoric acid, but it may be for example a solution of a bonding agent other than an acid but which is known in the art as a chemical bonding agent for magnesia, for example a solution of a phosphate other than phosphoric acid, such as a sequestered phosphatic solution. The expression "sequestered phosphatic solution" has the meaning which is known in the art and refers to a commercial product containing diammonium phosphate and polyphosphates. A more detailed description is found in British Patent No. 1,014,446 published Dec. 22, 1965.

It will be appreciated that mixtures of two or more compatible liquid chemical bonding agents may be used.

The amount of liquid bonding agent used may be for example from about 0.5% to 20% or more based on the total weight of the composition and up to for example 80% by weight based on the weight of the absorbent material. However the optimum amount may be readily determined in any particular case by routine experimentation.

The amount of liquid bonding agent used, such as sulphuric acid, is advantageously such that the quantity of agent present or produced on addition of water is between 0.5% and 1.5% of the weight of the refractory composition. Representative compositions may comprise, for example, from 25% to 40% by weight of dead-burned magnesite passing a British Standard 72 mesh sieve, from 60% to 75% by weight of dead-burned magnesite retained on a British Standard mesh sieve, and from 0.5 to 2.0% by weight of a product obtained by absorbing sulphuric acid in finely divided kieselguhr, the sulphuric acid being present in an amount of from 0.5% to 1.5% based on the total weight of the refractory composition. A preferred refractory composition contains 1% by weight of a sulphuric acid powder containing approximately 60% by weight of sulphuric acid.

Up to approximately 10% by weight of fine chrome ore may be incorporated in the refractory composition, a preferred quantity being 5%, and advantageously at least 2% by weight on the weight of the refractory composition consists of chrome ore particles finer than 30$\mu$.

Advantageously a small quantity, e.g. 0.5 to 2%, of boric acid is incorporated in the refractory composition a preferred quantity being 1% by weight.

Refractory compositions made according to the following specification may be used advantageously as castable compositions in the repair of hot furnaces. The following case is given as an example.

An L.D. converter used for the refining of iron by blowing oxygen on to molten metal is constructed with a taphole in the upper section of the barrel near the nose. During the operation of the converter the refined metal is poured from the vessel through this taphole with consequent wear on the material comprising the taphole. The materials used to maintain the shape of the hole are installed around a steel pipe by ramming from the outside, and pouring in as a slurry on the inside. Many castables which are satisfactory for cold repairs are not suitable for this type of application, lasting on average for not more than 12 casts. Material made according to this specification has, however, given tapholes which have lasted for over 18 casts and this represents a significant advance in repair materials.

Castable materials containing a sulphuric acid powder will now be described by way of example of the invention.

Castable materials were prepared by mixing together dead-burned magnesite of the composition and grading stated in Tables I and II respectively, and sulphuric acid powder, with additions of chrome ore and boric acid. The materials were mixed with sufficient water to enable them to be cast and were then cast into test pieces. Details of the composition of the castable materials and the properties of the test pieces made from them are shown in Table III.

Any chrome ore suitable for use in refractory materials may be used.

TABLE I.—COMPOSITION OF MAGNESIA USED

Constituent:
 $SiO_2$ _____weight percent__ 1.7
 $Al_2O_3$ _____do____ 0.2
 $Fe_2O_3$ _____do____ 1.2
 $CaO$ _____do____ 1.9
 $MgO$ _____do____ 95.0
Specific gravity _____gm./cc___ 3.55
Bulk density _____gm./cc___ 3.00

TABLE II.—GRADING OF MAGNESIA USED

Grading B.S. mesh: Parts by weight
 −5+8 _____ 24
 −8+16 _____ 28
 −16+72 _____ 12
 −72 _____ 31

The ball-milled fines used were 100% −72 mesh, and at least 60% −150 mesh, and possessed a specific surface area of 0.27 m.$^2$/gm.

TABLE III.—COMPOSITION AND PROPERTIES OF CASTABLE MATERIALS

| Composition | Parts by weight | Bulk density (g./cc.) | Cold compressive strength (p.s.i.) After drying at 120° C. | Compressive strength at 1,000° C. (p.s.i.) |
|---|---|---|---|---|
| 1. Magnesite, −5 mesh + 72 mesh | 64 | 2.74 | 4,310 | 200 |
| Magnesite ball milled fines, −72 mesh | 31 | | | |
| Chrome ore A, −72 mesh | 5 | | | |
| Sulphuric acid powder A[1] | 1 | | | |
| 2. Magnesite, −5 mesh +72 mesh | 64 | 2.77 | 2,420 | 150 |
| Magnesite ball milled fines, −72 mesh | 31 | | | |
| Chrome ore A, −72 mesh | 5 | | | |
| Sulphuric acid powder B[2] | 1 | | | |
| 3. Magnesite, −5 mesh +72 mesh | 64 | 2.77 | 2,780 | 250 |
| Magnesite ball milled fines, −72 mesh | 31 | | | |
| Chrome ore A, −72 mesh | 5 | | | |
| Sulphuric acid powder B | 1 | | | |
| Boric acid | 1 | | | |

[1] Sulphuric acid powder A was a Kieselguhr powder with about 65% $H_2SO_4$ absorbed.
[2] Sulphuric acid powder B was a Bentonite material with about 65% $H_2SO_4$ absorbed.

A further series of castable materials was made up using the same magnesia as before but with differing amounts of acid powder.

The composition and properties of the castables of this series are given in Table IV.

TABLE IV.—COMPOSITION AND PROPERTIES OF THE SECOND SERIES OF CASTABLE MATERIALS

| Composition | Parts by weight | Bulk density (g./cc.) After drying for 1 day at 110° C. | Cold compressive strength (p.s.i.) |
|---|---|---|---|
| 4. Magnesia | 100 | 2.80 | 1,890 |
| Chrome Ore A | 5 | | |
| Sulphuric acid powder B | 0.75 | | |
| 5. Magnesia | 100 | 2.81 | 3,100 |
| Chrome Ore A | 5 | | |
| Sulphuric acid powder B | 1.00 | | |
| 6. Magnesia | 100 | 2.76 | 4,770 |
| Chrome Ore A | 5 | | |
| Sulphuric acid powder B | 1.67 | | |
| 7. Magnesia | 100 | 2.72 | 4,560 |
| Chrome Ore A | 3 | | |
| Sulphuric acid powder B | 1 | | |
| 8. Magnesia | 100 | 2.69 | 2,100 |
| Sulphuric acid powder B | 1 | | |

A third series of castables was prepared using chrome ore of varying degrees of fineness. Magnesia of the same composition as in the previous two series of tests was used and the grading of the magnesia was as shown in Table II.

The composition of each of the test pieces prepared was: magnesia 100 parts by weight, chrome ore 5 parts by weight, and sulphuric acid powder B 1 part by weight. The specific surface of the chrome ore and the properties of the test pieces made from the castables are shown in Table V.

TABLE V.—GRADING OF CHROME ORE AND PROPERTIES OF TEST PIECES MADE FROM THE THIRD SERIES OF CASTABLES

| | Bulk density (g./cc.) After drying at 110° C. | Compressive strength (p.s.i.) |
|---|---|---|
| Specific Surface of Chrome Ore, m.$^2$/g.: | | |
| 0.8 | 2.70 | 2,070 |
| 0.66 | 2.70 | 1,800 |
| 0.55 | 2.71 | 3,270 |
| 0.4 | 2.70 | 3,650 |

The detailed grading of the chrome ores used in the present tests is shown in Table VI.

TABLE VI.—GRADING OF CHROME ORES USED IN THE TESTS

| Chrome Ore | Specific surface (m.²/g.) | B.S. Mesh | | | | | $-30\mu$, weight percent | $-10\mu$, weight percent |
|---|---|---|---|---|---|---|---|---|
| | | +72 | $-72$ +100 | $-100$ +200 | $-200$ +300 | $-300$ | | |
| A | 0.60 | 0 | 0 | 0 | 0 | 100 | 70 | 51 |
| B | 0.20 | 12.8 | 9.8 | 17.2 | 7.3 | 52.9 | 40 | 22 |
| C | 0.15 | 0.2 | 0.8 | 15.9 | 16.7 | 67.4 | 23 | 7 |

In the case of the castables shown in Table V, the coarsest chrome ore (0.4 m.²/g.) gave the highest cold compressive strength.

When more than 1% sulphuric acid powder was added to the castable, the reaction on addition of water was rather vigorous and gave rise to a setting time rather shorter than would often be desirable under the normal conditions of use of castables of the present kind.

A fourth series of castables using magnesia of the same composition and grading as used in the third series but using different chrome ores was made. The composition and properties of these castables are shown in Table VII.

TABLE VII.—COMPOSITION AND PROPERTIES OF THE FOURTH SERIES OF CASTABLES

| Composition | Parts by weight | After drying | |
|---|---|---|---|
| | | Bulk density (g./cc.) | Cold compressive strength (p.s.i.) |
| Magnesia | 94 | 2.66 | 2,100 |
| Chrome Ore C | 5 | | |
| Sulphuric acid powder B | 1 | | |
| Magnesia | 94 | 2.67 | 3,000 |
| Chrome Ore D | 5 | | |
| Sulphuric acid powder B | 1 | | |

Chrome ore D is made by ball milling chrome ore C to increase the quantity of particles $-30\mu$ and to bring it above 2 parts by weight of the total castable mix.

Table VI shows that addition of 3 parts of chrome ore A results in the presence in the castable of 2.1 parts by weight of chrome ore particles smaller than $30\mu$ and addition of 5 parts of chrome ore B results in the presence of 2.0 parts by weight of chrome ore particles smaller than $30\mu$. However, 5 parts by weight of chrome ore C contain only 1.1 parts by weight of particles smaller than $30\mu$.

The results show, therefore, that it is preferable that at least 2 parts by weight of chrome particles smaller than $30\mu$ should be present in the castable.

Following is an example of the preparation of a castable refractory composition from a neutral refractory material.

Fused alumina grain crushed to pass ³⁄₁₆ B.S. mesh together with 30% of ball-milled fused alumina was mixed with 7% of phosphoric acid powder (containing 70% free $H_3PO_4$) and 11% gauging water. The mixture was cast into a block and cured at 2–300° C. (As is normal with phosphoric acid bonded alumina material.) The resulting block possessed a cold compressive strength of about 2000 pounds per square inch.

In another example similar proportions and types of fused alumina were used but 5% of fine magnesia was added, together with 7% phosphoric acid powder. In this case the cast block did not require curing at 2–300° C. in order to develop a significant strength and after drying only at 120° C. had a cold compressive strength of 1500 pounds per square inch.

An acidic refractory composition was made from siliceous pebbles (containing 85–90% $SiO_2$) which had been crushed to pass a ³⁄₁₆ B.S. mesh and included about 20% of ball milled pebbles as the fine fraction. Approximately 2% by weight of fine magnesia was incorporated together with 1% sulphuric acid powder. On mixing with 7% gauging water and casting into a block the block developed a cold compressive strength after drying of 1000 pounds per square inch.

In the latter two cases an important part of the bonding action was the reaction between the small quantity of magnesia and the acid powder when water is added. The mixtures are still essentially neutral and acid respectively, in nature in spite of the small addition of fine magnesia.

As explained and described hereinbefore the compositions of the present invention may be used as castable refractory materials. Alternatively, however, the compositions, which are in the form of dry mixtures, may be mixed with water and placed in a furnace lining by ramming or by a gunning technique using, for example, a nozzle mix gun. A nozzle mix gun pneumatically conveys the dry free-flowing composition along a pipe, water being mixed with the dry composition immediately behind the discharge nozzle of the gun. The moistened material is normally ejected across and into the furnace and is deposited on the furnace structure where it sets and hardens. The amount of water which is added to such ramming and gunning compositions is generally different to that required to be added to the compositions of the present invention when they are used as castable materials.

It will be appreciated that in any particular combination of components the most satisfactory proportions of the components of compositions of the present invention may be readily found by routine experimentation.

Following is a description by way of example of refractory compositions in accordance with the present invention.

Listed in Table VIII are seven types of bonding powders comprising various inert materials having absorbed therein various liquid chemical bonding agents, the percentages by weight of inert absorbent material and liquid bonding agent being stated in the case of each type of bonding powder.

In Table IX are shown the chemical and grading analyses of two types of magnesia, designated "X" and "Y," which were used to make refractory compositions in accordance with the invention.

In Table X are shown the refractory properties obtained from three compositions, designated "1" to "3," of which "2" and "3" are compositions in accordance with the present invention, to which suitable quantities of water have been added, and Composition "1" is a composition not in accordance with the present invention, obtained by mixing the indicated quantities of Magnesia X, chromic anhydride and water. It will be noted that Compositions 2 and 3 show marked superiority in the compressive strength properties and also in the results for the refractoriness-under-load tests, when compared with Composition 1.

Table XI shows the refractory properties obtained from four refractory compositions designated "4" to "7," of which "5" and "7" are compositions in accordance with the present invention to which suitable quantities of water have been added, and Compositions "4" and "6" are merely mixtures of the indicated quantities of Magnesia "Y" and water with concentrated hydrochloric acid and orthophosphoric acid respectively. Here it will be seen that the refractory properties of the compositions made in accordance with the present invention namely Nos. 5 and 7 are comparable with Compositions 4 and 6 respectively which are not in accordance with the invention. It is also to be noted that Compositions 6 and 7 which both comprise phosphoric acid result in relatively low strength chemically-bonded compositions. This is due to the fact that magnesia and phosphoric acid react very rapidly.

When phosphate-bonded gunning mixes are used a separate tank of sequestered phosphatic solution is commonly attached to the gun and this solution is injected into the dry refractory material at the nozzle. It will be appreciated that this procedure can be inconvenient. However by use of the present invention as exemplified above the phosphate solution or phosphoric acid may be included in the dry refractory composition, thus dispensing with the need for mixing the refractory material with a phosphate solution at the mixing head of the nozzle, the refractory composition requiring only to be mixed with water at the nozzle.

TABLE VIII

| Bonding Powder | Inert Absorbent Material | Liquid Chemical Bonding Agent |
|---|---|---|
| A | 36% Kieselguhr | 64% Sulphuric Acid. |
| B | 36% Fuller's Earth | 64% Sulphuric Acid. |
| C | 90% Chrome Ore | 10% Sulphuric Acid. |
| D | 57% Kieselguhr | 43% Chromic Acid. |
| E | 82% Quartzite | 18% Chromic Acid. |
| F | 44% Kieselguhr | 56% Orthophosphoric Acid. |
| G | 58% Kieselguhr | 42% Hydrochloric Acid. |

TABLE IX

| | Magnesia X | Magnesia Y |
|---|---|---|
| Chemical analysis (Wt. percent): | | |
| $SiO_2$ | 0.64 | 2.45 |
| $Al_2O_3$ | 0.44 | 1.28 |
| $Fe_2O_3$ (total irons) | 1.26 | 1.82 |
| $Cr_2O_3$ | Nil | Nil |
| CaO | 0.94 | 1.99 |
| MgO | 96.05 | 92.31 |
| Loss | 0.17 | 0.15 |
| Mechanical Analysis (Wt. Percent):* | | |
| −5+8 | 24 | 24 |
| −8+16 | 28 | 28 |
| −16+72 | 12 | 12 |
| −72 | 36 | 36 |

*All sieves B.S. mesh. −indicates "passing"; + indicates "retained on".

It will be understood that the present invention provides a method of constructing or repairing refractory units of furnace linings which method comprises mixing a refractory composition as hereinbefore described with water so as to produce a chemically-bonded refractory material.

According to a particularly preferred aspect of this method the refractory composition comprises an inert absorbent material having absorbed therein a liquid chemical bonding agent, which is preferably a phosphate solution reactive to magnesite, the composition being mixed with water at the nozzle of a pneumatic nozzle mix gun and the resulting mixture being gunned into position in the furnace structure so as to form a chemically-bonded refractory material integral with the furnace structure.

It will be appreciated that the present invention as specifically described above provides an advantage in the convenience of mixing a single dry batch of refractory material only with water i.e. without the necessity for adding a third ingredient in the form of a liquid chemical bonding agent such as an acid.

We claim:
1. A substatially dry refractory composition, suitable, upon addition of water, for use in the manufacture and repair of furnace structures, consisting essentially of:
   (a) a refractory aggregate comprising from 10% to 100% of a fine fraction of solid, particulate, chemically-reactive refractory material with the remainder being a coarse fraction of refractory material, said refractory aggregate being mixed with
   (b) up to 50% by weight, based on the composition, of a dry, chemically inert, solid, particulate absorbent material selected from the group consisting of kieselguhr, bentonite, fuller's earth, chome ore, quartzite and mixtures thereof, said absorbent material having absorbed therein up to 80% by weight, based on the weight of the particulate absorbent material, of a liquid chemical bonding agent selected from the group consisting of sulphuric acid,

TABLE X

| | | | Properties of the composition | | | | | | | |
|---|---|---|---|---|---|---|---|---|---|---|
| | | | Dried at 120° C. | | Compressive strength at 1,000° C., lb./sq. in. | Cold compressive strength after 1 hr. at 1,000° C. | Fired at 1,650° C. for 5 hours | | | |
| | | | | | | | | | R.U.L. test, 10° C./min. | |
| | Composition | | | | | | | | | |
| Reference number of compositions | Components | Parts by weight | Bulk density, g./ml. | Compressive strength, lb./sq. in. | | | Linear change, percent | Bulk density, g./ml. | Compressive strength, lb./sq. in. | Initial fail temp., ° C. | Complete fail temp., ° C. |
| 1 | Magnesia X / Chromic anhydride / Water | 100 / 1 / 8 | 2.68 | 6,100 | 170 | 110 | | | | 1,430 | 1,610 |
| 2 | Magnesia X / Bonding powder D / Water | 100 / 2.3 / 8 | 2.67 | 8,700 | 290 | 290 | −2.7 | 2.85 | 5,300 | 1,560 | (¹) |
| 3 | Magnesia X / Bonding powder E / Water | 100 / 6 / 7.5 | 2.66 | 6,700 | 300 | 340 | −3.0 | 2.80 | 6,200 | 1,650 | (²) |

¹ Fail after 56 mins. at 1,650° C.  ² 3.7% subsidence after 2 hours at 1,650° C.

TABLE XI

| | | | Properties of the composition | | | | | | | |
|---|---|---|---|---|---|---|---|---|---|---|
| | | | Dried at 120° C. | | Compressive strength at 1,000° C., lb./sq. in. | Cold compressive strength after 1 hr. at 1,000° C. | Fired at 1,650° C. for 5 hours | | | |
| | | | | | | | | | R.U.L. test, 10° C./min. | |
| | Composition | | | | | | | | | |
| Reference number of compositions | Components | Parts by weight | Bulk density, g./ml. | Compressive strength, lb./sq. in. | | | Linear change, percent | Bulk density, g./ml. | Compressive strength, lb./sq. in. | Initial fail temp., ° C. | Complete fail temp., ° C. |
| 4 | Magnesia Y / Conc. hydrochloric acid / Water | 100 / 0.5 / 7 | 2.75 | 5,400 | 80 | 220 | −3.4 | 3.02 | 6,900 | 1,398 | 1,605 |
| 5 | Magnesia Y / Bonding powder G / Water | 100 / 1.2 / 8 | 2.73 | 2,500 | 110 | 360 | −3.5 | 3.00 | 6,400 | 1,390 | 1,583 |
| 6 | Magnesia Y / Orthophosphoric acid / Water | 100 / 0.5 / 8.5 | 2.61 | 250 | 90 | 150 | −3.4 | 2.91 | 4,100 | 1,375 | 1,462 |
| 7 | Magnesia Y / Bonding powder F / Water | 100 / 1 / 8 | 2.61 | 230 | 80 | 150 | −3.1 | 2.90 | 2,700 | 1,360 | 1,440 | hydrochloric acid, phosphoric acid, chromic acid, sequestered phosphatic solutions and mixtures thereof, said bonding agent being reactive with at least a proportion of said fine fraction of refractory material on addition of water to the mixture of (a) and (b).

2. A refractory composition as claimed in claim 1 wherein the fine fraction of refractory material consists of finely divided dead-burned magnesite.

3. A refractory composition as claimed in claim 1 wherein substantially all of the fine fraction of the refractory material passes a British Standard 72 mesh sieve.

4. A refractory composition as claimed in claim 1 wherein the liquid chemical bonding agent is sulphuric acid and wherein the quantity of sulphuric acid absorbed in the chemically inert absorbent material is between 0.5 and 1.5% by weight of the refractory composition.

5. A refractory composition as claimed in claim 1 which comprises in addition up to about 10% of finely divided chrome ore.

6. A refractory composition consisting essentially of an admixture of:
  (a) from 25% to 40% by weight of dead-burned magnesite passing a British Standard 72 mesh sieve;
  (b) from 60% to 75% by weight of dead-burned magnesite retained on a British Standard 72 mesh sieve, and
  (c) from 0.5 to 2.0% by weight of a product obtained by absorbing sulphuric acid in finely divided kieselguhr, the sulphuric acid being present in an amount of from 0.05% to 1.5% based on the total weight of the refractory composition.

References Cited

UNITED STATES PATENTS 2,852,401   9/1958   Hansen et al. _____ 106—65

JAMES E. POER, Primary Examiner

U.S. Cl. X.R.

106—59, 65, 66, 67, 69, 105